though this is not essential for purposes of the invention.

United States Patent Office 3,433,777
Patented Mar. 18, 1969

3,433,777
EMULSIFIABLE POLYOLEFIN COMPOSITION AND PROCESS FOR ITS PREPARATION
Marion Otis Brunson, Kingsport, Tenn., assignor to Eastman Kodak Company, Rochester, N.Y., a corporation of New Jersey
No Drawing. Continuation-in-part of application Ser. No. 444,405, Mar. 31, 1965. This application Dec. 20, 1966, Ser. No. 603,139
U.S. Cl. 260—88.2
Int. Cl. C08f 15/04, 27/28, 47/16
12 Claims

ABSTRACT OF THE DISCLOSURE

Emulsifiable low molecular weight amorphous modified polyolefin compositions and processes for their preparation. Modified amorphous polyolefin compositions are prepared by reacting a low viscosity amorphous polyolefin having an inherent viscosity of less than 0.5 with an unsaturated polycarboxylic component such as maleic anhydride to produce a substantially non-cross-linked substantially emulsifiable modified polyolefin. These polyolefins can be used for many purposes including laminating aluminum to paper and as modifiers to improve the adhesion properties of petroleum waxes.

This application is a continuation-in-part of application Ser. No. 444,450 filed Mar. 31, 1965, now abandoned.

This invention relates to modified poly-α-olefin polymers having improved physical properties and the process for preparation thereof. One of the aspects of this invention concerns novel emulsifiable low molecular weight poly-α-olefin compositions. Another aspect of this invention concerns the reaction product of amorphous poly-α-olefins and unsaturated polycarboxylic acid compounds.

It is known in the art to react poly-α-olefin compounds with polycarboxylic compounds. However, the teachings of the prior art are directed to forming higher molecular weight materials which may be more readily fabricated into shaped articles. These shaped articles may then be crosslinked under relatively mild conditions into high molecular weight plastics which are tougher than the uncured plastics. One such prior art teaching is directed to forming high molecular weight polyethylene compositions by reacting polyethylene having a density of from .91 to about .96 with maleic anhydride. These compositions have a higher molecular weight and are less soluble than the unmodified polymeric material. Such prior art teachings therefore are directed to forming higher molecular weight polyethylene.

Accordingly, it is one of the objects of the present invention to provide new and improved poly-α-olefin compositions having improved physical properties.

Another object of this invention is to provide poly-α-olefin compositions having low softening points.

A further object of this invention is to provide an emulsifiable poly-α-olefin composition.

Still another object of the invention is to form low molecular weight amorphous poly-α-olefin compositions exhibiting good adhesion properties.

A still further object of this invention is to improve the emulsifiability of unemulsifiable poly-α-olefin compositions by reacting the unemulsifiable compound with unsaturated polycarboxylic compounds without a substantial increase in inherent viscosity of the unemulsifiable compound.

Another object is to increase the emulsifiability of poly-α-olefin compounds without a substantial increase in molecular weight of the unemulsifiable compound.

A further object is to improve the emulsifiability of unemulsifiable poly-α-olefin compounds by reacting with polycarboxylic compounds to prepare a reaction product having substantially the same inherent viscosity as the unemulsifiable compound.

Another and still further object of this invention is to provide novel low molecular weight amorphous poly-α-olefin compositions affording a complete spectrum of useful purposes.

Further objects and advantages of the invention will be apparent to those skilled in the art from the accompanying disclosure and claims.

In accordance with this invention, it has been found that amorphous homopolymers of alpha-monoolefins containing 3 to 12 carbon atoms and copolymers thereof can be modified to produce polymers having improved physical and chemical properties by treating such amorphous homopolymers or copolymers wtih an organic unsaturated polycarboxylic acid or an acid anhydride or an acid ester derived therefrom. These modified polymeric materials are of low molecular weight and emulsifiable in aqueous medium.

This invention therefore in one aspect relates to modified amorphous poly-α-olefin compositions of monoolefins containing 3 to 12 carbon atoms. Hence, the amorphous homopolymers and copolymers of propylene, 1-butene, 4-methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, 1-decene, and the like have been found to produce novel compositions when reacted with unsaturated organic polycarboxylic acids or an acid anhydride or an acid ester derived therefrom, as more fully described hereinafter.

The novel poly-α-olefin compositions of this invention are prepared by reacting the amorphous polymer with an unsaturated polycarboxylic acid, anhydride or ester thereof. These homopolymeric or copolymeric amorphous poly-α-olefins are prepared by conventional polymerization processes for preparing polymeric materials. For example, one such suitable polymer is the hexane extracted amorphous polypropylene prepared with coordination catalyst such as brown $TiCl_3$ and diethylaluminum fluoride, as disclosed in "Relationship of Catalyst Composition to Catalytic Activity for the Polymerization of α-Olefins," by Coover, et al., Macromolecular Reviews, vol. I, published by Interscience Publishers, a division of John Wiley Inc., 1966. Amorphous polypropylene has a Ring and Ball Softening Point (ASTM–D36–26) of about 93° C., inherent viscosity of about .1 to .5, a melt viscosity of 500–6,000 centipoise at 190° C., and an acid number of less than .1. The modified amorphous polymers have a melt viscosity range from 250–6,000 cp. at 190° C., (ASTM–D1238–57T using .04±0.0002 inch orifice) and an inherent viscosity of about .1 to .5. [Schulken and Sparks, Journal Polymer Science 26 227 (1957)]. These amorphous products are not emulsifiable as such, but upon reacting them with unsaturated polycarboxylic acids, anhydrides or esters thereof, thereby increasing the acid number and saponification number of the amorphous polymer, makes them emulsifiable.

The amorphous poly-α-olefins are reacted with unsaturated polycarboxylic acids, anhydrides or esters thereof at temperatures above 200° C. in the absence of oxygen or catalyst. The reaction may be carried out in a suitable melt atmosphere, such as nitrogen, but pressure is not necessary for carrying out the invention. Reaction time is dependent on temperature and may vary between 15 minutes and four hours. Suitable unsaturated polycarboxylic acids, anhydrides and esters thereof for reacting with the amorphous polymers, are, for example, maleic acid, maleic anhydride, fumaric acid, citraconic anhydride, aconitic anhydride, itaconic anhydride, dimethyl maleate, dimethyl fumarate, methyl ethyl maleate, dibutyl maleate, dipropyl maleate, etc. or those compounds which form these compounds at reaction temperatures such as citric acid, for example. These modified poly-α-olefin compositions have a melt viscosity of 250–6,000 centipoise at 190° C. and a saponification number of at least 6, preferably about 7–30.

One method for the determination of saponification number of maleated amorphous polypropylene is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized 0.10 N KOH in ethyl alcohol. Heat under reflux for 45 min. Cool, and add from a buret standardized 0.10 N $CH_3COOCH$ in xylene until the mixture is acid to phenolphthalein. Add at least 1 ml. excess $CH_3COOH$. Reheat the solution under reflux for 15 min. Remove from heat, add 5 ml. water, and titrate to a faint pink end point with 0.10 N KOH in ethyl alcohol. Run a blank in this manner using the same amounts of reagents and the same heating times. Calculation:

$$\left[\frac{[(\text{ml. KOH}\times N)-(\text{ml. CH}_3\text{COOH}\times N)]-[(\text{ml. KOH}\times N)-(\text{ml. CH}_3\text{COOH}\times N)]}{\text{g. Sample}}\right]\times 56.1 = \text{Sap. No.}$$

(for sample)     (for blank)

The unreacted unsaturated polycarboxylic acid is separated from the reaction mixture by purging the reaction mixture with an inert gas while the melt temperature is between 100 and 300° C. After the unreacted unsaturated polycarboxylic acid has been removed, the modified poly-α-olefin may be further purified by vacuum stripping.

This invention can be further illustrated by the following examples of preferred embodiments thereof; although it will be understood that these examples are included merely for purposes of illustration and are not intended to limit the scope of the invention unless otherwise specifically indicated.

Example 1

A total of 125 g. of amorphous polypropylene having an I.V. of .27 and 6.3 grams of maleic anhydride was placed in a 300 ml. stainless steel rocking autoclave. The autoclave was purged with dry nitrogen to remove air and it was heated to 325° C. and maintained at this temperature with rocking for 30 minutes. The product was removed from the autoclave and the waxy material had an inherent viscosity of .2, a saponification number of about 31.5, a flow point of 64–78° C. and a penetration hardness of 29 (measured with a 50 gram weight for 5 seconds at 25° C.).

Low viscosity maleated polymers were also produced in the above manner from amorphous 50/50 propylene/1-butene copolymer 95/5 propylene/1-pentene copolymer, 90/10 propylene/1-hexene copolymer, 80/20 propylene/4-methyl-1-pentene copolymer, 75/25 propylene/1-dodecene copolymer and 90/10 1-butene/1-hexene copolymer.

Example 2

A total of 125 g. of amorphous 90/10 propylene/1-butene copolymer having a melt viscosity of 3,000 cp. at 190° C. was placed in a glass, round-bottomed flask. The flask was flushed with dry nitrogen and carefully immersed in a metal bath maintained at 325° C. Molten maleic anhydride (6.25 g.) was gradually added over a 15-min. period with stirring. A steam condenser attached to one neck of the flask prevented the loss of maleic anhydride. The reaction mixture was stirred for an additional 30 min. at 325° C., then cooled to 200° C. and poured from the flask onto a metal tray. The light tan product had a melt viscosity of 975 cp. at 190° C. and an inherent viscosity of .22 and saponification number of 9.7.

Example 3

Low viscosity amorphous 50/50 propylene/1-butene copolymer having a melt viscosity of 3400 cp. at 190° C. was treated according to the general procedure of Example 2 except that citraconic anhydride (7.15 g.) was used instead of the maleic anhydride. The light tan product had a melt viscosity of 1200 cp. at 190° C. and an inherent viscosity of .24 and saponification number of 10.5.

Example 4

A total of 125 g. of low-viscosity amorphous 95/5 propylene/1-pentene copolymer having a melt viscosity of 4,000 cp. at 190° C. and maleic acid (7.4 g.) were placed in a 300 ml. stainless steel rocking autoclave. After flushing it with dry nitrogen to remove air, the autoclave was heated at 325° C. with rocking for 30 min. The tan product had a melt viscosity of 1200 cp. at 190° C. and an inherent viscosity of .25 and saponification number of 7.8. Similar results were obtained using fumaric acid.

Example 5

Low viscosity amorphous 90/10 propylene/1-hexene copolymer having a melt viscosity of 3800 cp. at 190° C. was maleated according to the general procedure of Example 4 except that dimethyl maleate (9.2 g.) was used instead of maleic acid and the reaction was conducted for 1 hour. The tan product had a melt viscosity of 850 cp. at 190° C. and an inherent viscosity of .20 and saponification number of 6.

Example 6

Low viscosity amorphous 80/20 propylene/4-methyl-1-pentene copolymer having a melt viscosity of 3500 cp. at 190° C. was maleated according to the general procedure of Example 4 except that dimethyl fumarate (10 g.) was used instead of the maleic acid. The tan product had a melt viscosity of 1000 cp. at 190° C. and an inherent viscosity of .21 and saponification number of 6.2.

Example 7

Low viscosity amorphous 75/25 propylene/1-dodecene copolymer having a melt viscosity of 3750 cp. at 190° C. was maleated according to the general procedure of Example 4 except that the monomethyl ester of maleic acid (8.5 g.) was used instead of maleic acid. The tan product had a melt viscosity of 1300 cp. at 190° C. and an inherent viscosity of .23 and saponification number of 9.2.

Example 8

Low viscosity amorphous 9/10 1-butene/1-hexene copolymer having a melt viscosity of 4000 cp. at 190° C. was maleated with maleic anhydride according to the procedure of Example 2. The light tan product had a melt viscosity of 1500 cp. at 190° C. and an inherent viscosity of .27 and a saponification number of 10.3.

Example 9

About 125 grams of low viscosity amorphous poly-1-butene of 3,300 centipoise at 190° C. was placed in a glass, round-bottom flask. The flask was flushed with dry nitrogen and carefully immersed in a metal bath maintained at 325° C. Molten maleic anhydride (6.25 g.) was gradually added over a 15-minute period with stirring. A steam condenser attached to one neck of the flask prevented the loss of maleic anhydride. The reaction mixture was stirred for an additional 30 minutes at 325° C., then cooled to about 200° C. and poured from the flask onto a metal tray. The waxy product had a melt viscosity of 900 centipoise at 190° C. and an inherent viscosity of .22.

As described hereinabove, this invention consists of new and novel modified amorphous poly-α-olefins having 3–12 carbon atoms having an inherent viscosity of .1 to about .5 obtained by reacting the amorphous polyolefin with an unsaturated polycarboxylic acid, anhydride or ester thereof to prepare an emulsifiable modified poly-α-olefin having a melt viscosity of 250–6,000 centipoise at 190° C. and a saponification number of at least 6, preferably 7–30.

The modified amorphous low molecular weight poly-α-olefin compositions of this invention are useful for many purposes including laminating aluminum foil to kraft paper and as modifiers to improve the adhesion properties of petroleum waxes. Also these modified amorphous polyolefins can be emulsified to form emulsions using anionic and nonionic emulsification systems.

The invention has been described in considerable detail with particular reference to preferred embodiments thereof, but it will be understood that variations and modifications can be effected within the spirit and scope of the invention as described hereinabove and as defined in the appended claims.

I claim:

1. An emulsifiable low viscosity amorphous modified poly-α-olefin composition having a saponification number of at least 6, a melt viscosity of 250–6,000 centipoise at 190° C. and an inherent viscosity of less than about 0.5 prepared by reacting an amorphous poly-α-olefin with an unsaturated polycarboxylic component at temperatures above 200° C.

2. An emulsifiable low viscosity amorphous modified poly-α-olefin composition according to claim 1 having a saponification number of at least 6, a melt viscosity of 250–6,000 centipoise and 190° C. and an inherent viscosity of about .1 to about .5 prepared by reacting an amorphous poly-α-olefin with an unsaturated polycarboxylic component.

3. An emulsifiable low viscosity amorphous modified homopolymeric poly-α-olefin composition according to claim 2 having a saponification number of at least 6, a melt viscosity of 250–6,000 centipoise at 190° C. and an inherent viscosity of about .1 to about .5 prepared by reacting an amorphous homopolymeric poly-α-olefin with an unsaturated polycarboxylic compound at temperatures above 200° C.

4. An emulsifiable low viscosity amorphous modified copolymeric composition according to claim 2 having a saponification number of at least 6, a melt viscosity of 250–6,000 centipoise at 190° C. and an inherent viscosity of about .1 to about .5 prepared by reacting an amorphous copolymeric poly-α-olefin with an unsaturated polycarboxylic compound at temperatures above 200° C.

5. An emulsifiable low viscosity amorphous modified polypropylene according to claim 3 having a saponification number of at least 6, a melt viscosity of 250–6,000 centipoise at 190° C. and an inherent viscosity of about .1 to about .5 prepared by reacting amorphous polypropylene with an unsaturated polycarboxylic compound at temperatures above 200° C.

6. An emulsifiable low viscosity amorphous modified propylene/butene-1 copolymer composition according to claim 4 having a saponification number of at least 6, a melt viscosity of 250–6,000 centipoise at 190° C. and an inherent viscosity of about .1 to about .5 prepared by reacting amorphous propylene-butene-1-copolymers with an unsaturated polycarboxylic compound at temperatures above 200° C.

7. A process for the preparation of an emulsifiable modified amorphous poly-α-olefin composition according to claim 1 which comprises reacting an amorphous poly-α-olefin having an inherent viscosity of less than 0.5 with an unsaturated polycarboxylic component at temperatures above 200° C. to produce a substantially non-crosslinked substantially emulsifiable modified poly-α-olefin having a saponification number of at least 6, a melt viscosity of 250–6,000 centipoise at 190° C. and an inherent viscosity of less than about 0.5.

8. A process according to claim 7 for the preparation of an emulsifiable low viscosity modified amorphous poly-α-olefin which comprises reacting an amorphous poly-α-olefin having an inherent viscosity of about .1 to .5, an acid number of less than .1 and a melt viscosity of about 500–6,000 centipoise at 190° C. with a member of the group consisting of unsaturated polycarboxylic acids, unsaturated polycarboxylic acid anhydrides and unsaturated polycarboxylic acid esters at a temperature of 200° to 400° C. to produce a substantially non-crosslinked substantially emulsifiable modified poly-α-olefin having a saponification number of at least 6, a melt viscosity of 250–6,000 centipoise at 190° C. and an inherent viscosity of about .1 to about .5.

9. A process according to claim 8 for the preparation of an emulsifiable low viscosity modified amorphous poly-α-olefin composition which comprises reacting amorphous homopolymeric compositions prepared from α-olefins having 3–12 carbon atoms and having an inherent viscosity of about .1 to about .5 with a member of the group consisting of unsaturated polycarboxylic acids, unsaturated polycarboxylic acid anhydrides and unsaturated polycarboxylic acid esters at a temperature of 200 to 400° C. to produce a substantially emulsifiable modified poly-α-olefin having a saponification number of at least 6, a melt viscosity of 250–6,000 centipoise at 190° C. and an inherent viscosity of about .1 to about .5.

10. A process according to claim 9 for the preparation of an emulsifiable low viscosity modified amorphous poly-α-olefin composition which comprises reacting copolymeric compositions prepared from α-olefins having 3–12 carbon atoms and having an inherent viscosity of about .1 to about .5 with a member of the group consisting of unsaturated polycarboxylic acids, unsaturated polycarboxylic acid anhydrides and unsaturated polycarboxylic acid esters at a temperature of 200 to 400° C. to produce a substantially non-crosslinked substantially emulsifiable modified amorphous poly-α-olefin copolymer having a saponification number of at least 6, a melt viscosity of 250–6,000 centipoise at 190° C. and an inherent viscosity of about .1 to about .5.

11. A process according to claim 10 for the preparation of an emulsifiable low viscosity modified amorphous polypropylene composition which comprises reacting amorphous polypropylene having an inherent viscosity of about .1 to about .5 with a member of the group consisting of unsaturated polycarboxylic acids, unsaturated polycarboxylic acid anhydrides and unsaturated polycarboxylic acid esters at a temperature of about 200 to 400° C. to produce a substantially non-crosslinked substantially emulsifiable modified amorphous polypropylene having a saponification number of at least 6, a melt viscosity of 250–5,000 centipoise at 190° C. and an inherent viscosity of about .1 to .5.

12. A process according to claim 11 for the preparation of an emulsifiiable low viscosity amorphous propylene/butene-1 composition which comprises reacting low viscosity amorphous propylene/butene-1 composition having an inherent viscosity of about .1 to about .5 with a member of the group consisting of unsaturated polycarboxylic acids, unsaturated polycarboxylic acid anhydrides and unsaturated polycarboxylic acid esters at a temperature of about 200–400° C. to produce a substantially non-crosslinked substantially emulsifiiable modified amorphous propylene/butene-1 composition having a saponification number of at least 6, a melt viscosity of 250–6,000 centipoise at 190° C. and an inherent viscosity of about .1 to about .5.

References Cited

UNITED STATES PATENTS 2,973,344   2/1961   Fasce.
2,766,214   10/1956  Erchak.

JOSEPH L. SCHOFER, *Primary Examiner.*

L. E. DELMAN, *Assistant Examiner.*

U.S. Cl. X.R.

260—93.7, 94.9, 78.4

UNITED STATES PATENT OFFICE
CERTIFICATE OF CORRECTION

Patent No. 3,433,777                          March 18, 1969

Marion Otis Brunson

It is certified that error appears in the above identified patent and that said Letters Patent are hereby corrected as shown below:

Column 5, line 42, after "component" insert -- at temperatures above 200° C. --; line 71, "propylene-butene-1-copolymers" should read -- propylene/butene-1 copolymers --.

Signed and sealed this 7th day of April 1970.

(SEAL)
Attest:

Edward M. Fletcher, Jr.                      WILLIAM E. SCHUYLER, JR.
Attesting Officer                               Commissioner of Patents